(12) United States Patent
Bergstrom et al.

(10) Patent No.: US 7,356,075 B2
(45) Date of Patent: Apr. 8, 2008

(54) METHOD AND APPARATUS FOR SIGNAL SEPARATION

(75) Inventors: Chad Scott Bergstrom, Chandler, AZ (US); Ghassan Chehade Maalouli, Scottsdale, AZ (US); Jeffery Scott Chuprun, Scottsdale, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 691 days.

(21) Appl. No.: 10/853,376

(22) Filed: May 24, 2004

(65) Prior Publication Data

US 2005/0259724 A1  Nov. 24, 2005

(51) Int. Cl.
*H04B 1/00* (2006.01)

(52) U.S. Cl. .................................. 375/150; 375/346

(58) Field of Classification Search ................ 375/130, 375/131, 136, 139, 147–152, 346
See application file for complete search history.

(56) References Cited

U.S. PATENT DOCUMENTS

| | | | | |
|---|---|---|---|---|
| 5,959,966 | A * | 9/1999 | Torkkola ..................... | 370/203 |
| 6,240,282 | B1 * | 5/2001 | Kleider et al. ........... | 455/226.1 |
| 6,711,528 | B2 * | 3/2004 | Dishman et al. ............ | 702/189 |
| 6,865,490 | B2 * | 3/2005 | Cauwenberghs et al. ..... | 702/17 |

OTHER PUBLICATIONS

Anne Ferreol et al., "on the behavior of current secon and higher order blind source separation methods of cyclostationary sources", Jun. 6, 2000, IEEE Transactions on Signal Processing, vol. 48 No. 6,pp. 1712-1725.*

Akhilesh Jha, Efstratios Nikolaidis,Sathya Gangadharan, *Vibration of Dynamic Systems Under Cyclostationary Excitations*, 13th ASCE Engineering Mechanics Division Conference, 1999, Baltimore Maryland, 18 pages, Virginia Polytechnic Institute and State University, Blacksburg, VA.

A.J. Weiss, B. Friedlander, *Simultaneous Signals in IFM Receivers*, IEE Proc.—Radar, Sonar Navig., Aug. 1997, p. 181-185, vol. 144, No. 4.

D. Yellin, B. Friedlander, *A Maximum Likelihood Approach to Blind Separation of Narrowband Digital Communication Signals*, IEEE, 1997, p. 679-683, University of California, Davis, CA.

Kari Torkkola, *Blind Signal Separation in Communications: Making Use of Known Signal Distributions*, IEEE DSP Workshop, Bryce Canyon, UT, Aug. 1998, Motorola, Phoenix Corporate Research Labs, AZ.

CECOM, Research, Development and Engineering Center, *Master List of Technology Needs*, Jan. 2002, p. 1-19, Fort Monmouth, NJ.

* cited by examiner

*Primary Examiner*—David C. Payne
*Assistant Examiner*—Rahel Guarino
(74) *Attorney, Agent, or Firm*—Ingrassia Fisher & Lorenz, P.C.

(57) ABSTRACT

An embodiment of a method for parameterizing an input signal includes non-linearly transforming the input signal, removing higher order terms by passing the input signal through a low pass filter to produce a linear combination of data symbols and DC components, solving for the DC components, separating a plurality of mixed baseband signals from the input signal, and coordinate transforming each of the separated signals from polar coordinates to Cartesian coordinates. An embodiment of a receiver includes a non-linear transform operator receiving a digitized input signal and adapted to produce a linear combination of data symbols, DC components, and carrier effects; a low-pass filter for removing higher order terms; a separator unit for separating the plurality of mixed baseband signals; and a coordinate transform for converting the separated signals from polar coordinates to Cartesian coordinates.

20 Claims, 6 Drawing Sheets

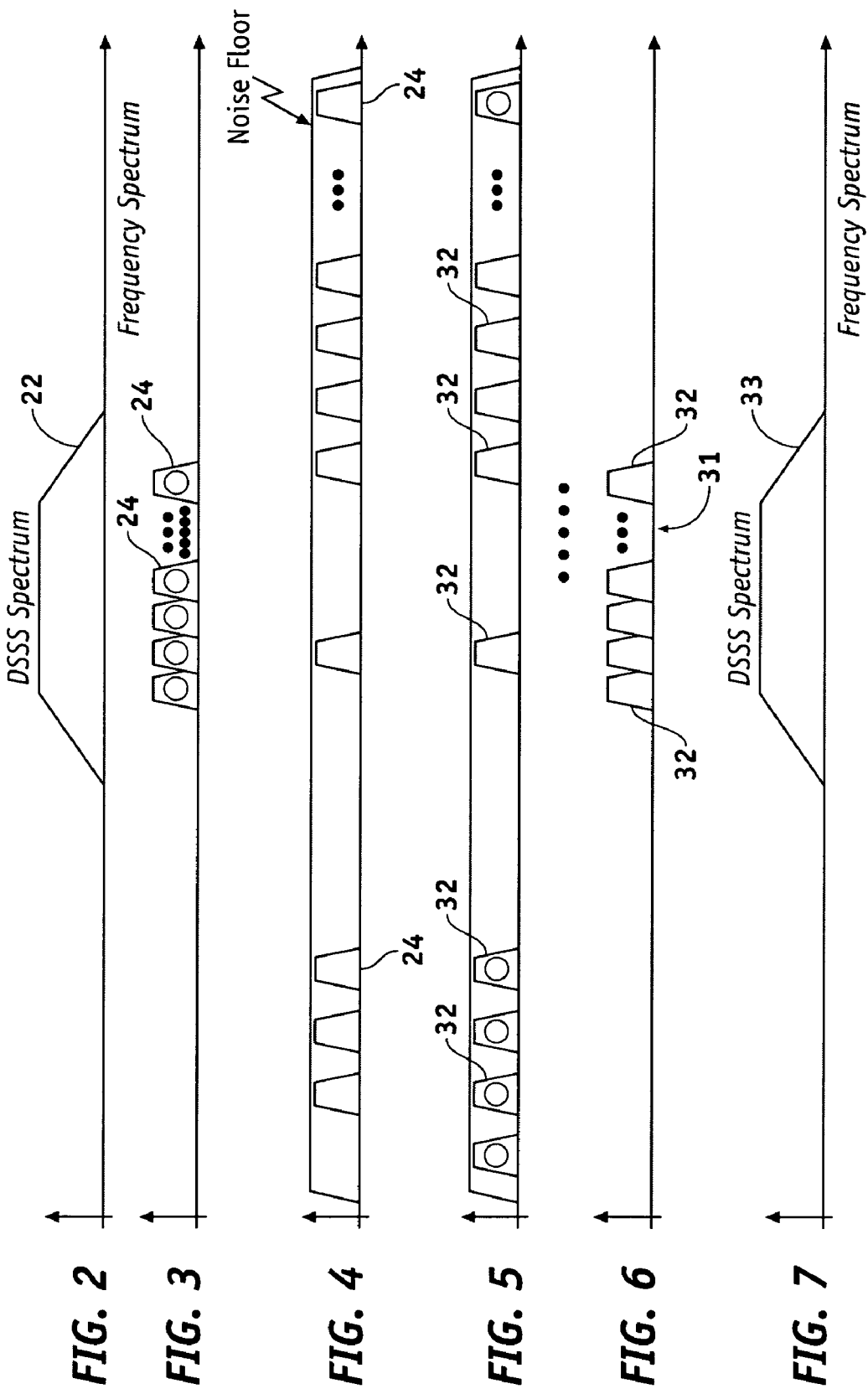

METHOD AND APPARATUS FOR SIGNAL SEPARATION

FIELD OF THE INVENTION

The present invention generally relates to spread spectrum communication, and more particularly relates to direct sequence spread spectrum communication using a polyphase channelization and a non-contiguous spectrum underlay based on standard and cyclostationary signal detection.

BACKGROUND OF THE INVENTION

Radio frequency (RF) spectrum is a scarce resource. In a cellular or personal communications systems environment, an increasing number of users need to be simultaneously serviced while also attempting to avoid interference among such users. One way to increase the number of simultaneous users on a given frequency band is code division multiple access (CDMA). CDMA refers to a form of multiplexing which allows numerous signals to occupy a single transmission channel thereby optimizing the use of available bandwidth. This technology is generally used in ultra-high-frequency (UHF) cellular telephone systems in the 800-MHz and 1.9-GHz bands.

CDMA is generally a complex, medium access control layer, which utilizes communications and signal processing schemes such as analog-to-digital conversion (ADC) and spread spectrum technology. Audio signals are digitized and processed by a modulator. In a frequency hopped system, the modulated signal is transmitted over a finite set of carrier frequencies with a sequence known a priori to a transmitter and a receiver. The CDMA receiver is reprogrammed to receive signals that are time and frequency aligned with those of the transmitter. This technique generally ensures that communications can be established over a link that is robust in a jamming environment.

In multi-code (MC) CDMA radio telephone systems, several CDMA signals associated with a single user may be sent between two stations in order to provide the user with a higher data rate. In such systems, each CDMA signal associated with a single user is spread using direct sequence (DS) spreading orthogonal codes such as Walsh codes. The spread signals are then scrambled using pseudo-noise (PN) sequence prior to transmission. As such, CDMA may be referred to more generally as DSPN. However, transmission quality of CDMA signals in such systems typically degrades when the signals travel over more than one path between the transmitter and the receiver. This is because such "multipath propagation" causes co-channel interference between the transmitted CDMA signals. Multiuser communication systems that employ CDMA exhibit a limit on the number of users that can simultaneously communicate over a channel and maintain a specified level of performance per user. This limitation is caused by user interference dominance over additive thermal noise.

The CDMA codes are generated by functions, such as Walsh functions, which are mathematically orthogonal in higher dimensional space. Thus, any two Walsh functions are orthogonal to each other, and signals encoded with two separate Walsh functions should generally cause no mutual interference when they are time aligned. However, because multiple signals often are not time aligned, complete orthogonality is usually not achieved in practice. As a result, interference between otherwise orthogonal signals occurs. This is known as multiple access interference (MAI).

Rigorous analysis of multiple signal interference space may be further complicated by co-channel interference from signals having analytic and bandpass properties that are unknown. Separation of co-channel and adjacent channel interference in a mobile environment may be further complicated by fading and Doppler effects. Many current research efforts at addressing co-channel interference make a number of simplifying assumptions such as identical carriers, perfect carrier recovery, identical modulation domains, known data rates and bandwidths, isolated signals (e.g., for classification), non-ambiguous signal distributions, and stationary non-mobile conditions.

The separation of independent sources from an array of sensors is a classic and difficult problem in signal processing. Generally, the signal sources as well as their mixture characteristics are unknown. Without knowledge of the signal sources, other than a general assumption that the sources are independent, the signal processing is commonly known in the art as the blind separation of sources (BSS). The separation is "blind" because nothing is assumed about the independent source signals or about the mixing process. BSS techniques rely only on source signal independence and non-Gaussianity assumptions. BSS is a system in which the output of an independent mixture of blind sources and channels is observed and the input signals are recovered based on observations only.

A typical example of the blind separation of source signals is where the source signals are sounds generated by two independent sources, such as two (or more) separate speakers. An equal number of microphones (two in this example) are used to produce mixed signals, each composed as a weighted sum of the source signals. Each of the source signals is delayed and attenuated by some unknown amount during passage from the speaker to a microphone, where the source signals are mixed with delayed and attenuated components of other source signals. Multi-path signals, generated by multiple reflections of the source signals, may be further mixed with direct source signals. This is generally known as a "cocktail party" problem, since a person generally wishes to listen to a single sound source while filtering out other interfering sources, including multi-path signals.

In the cellular telecommunications art, for example, a receiver must eliminate interfering signals from neighboring cells or the same cell to avoid unacceptable levels of interference. Generally, a static linear signal mixing model has been used and applied to separation of multiple signals. A common assumption is made that the statistical properties of the signal and the channel remain stationary. However, in mobile communications, the signals are subject to fading. Usually there is no direct line of sight from the transmitter to the receiver, only multiple reflected and diffracted signal components reach the receiver. For example, obstacles such as buildings interfere with signal path and create reflections. When either the receiver or the transmitter is moving, such as in an urban environment, building reflections are changing very rapidly.

A signal classifier is a device that analyzes an input signal to determine a signal class of a plurality of signal classes to which the signal belongs. Signal classifiers have been used in communications systems to classify signals received from communications channel to determine how to properly process the signals. For example, a receiver generally needs to know the type of modulation present in a received signal to properly demodulate the signal. A signal classifier can be used to determine the modulation types so that a proper demodulation method can be selected.

In general, all signal classifiers examine signal feature differences to discriminate between signal classes. A cluttered, interference-laden environment tends to reduce the possible resolution between signal classes, resulting in a situation where similar signal classes are difficult to distinguish. For this reason, many conventional signal classifiers use "signal-specific" procedures and signal processing steps that preclude addition or deletion of signals-of-interest.

In view of the foregoing, it is desirable to provide co-channel interference separation that is effective for the more general cases wherein: modulations are not known a priori; signals are asynchronous; data rates, bandwidths, and carrier frequencies are unknown; and, the signal environment can include any combination of modulation domains. In addition, it would be desirable to provide spread spectrum communication having interference mitigation using co-channel interference separation that is effective in the aforementioned more general cases. Furthermore, additional desirable features provided by the invention will become apparent to one skilled in the art from the drawings, foregoing background, following detailed description, and appended claims.

BRIEF SUMMARY

An apparatus is provided for spread spectrum receiver. The apparatus includes: a signal receptor for receiving a digitized communications signal; a first processor adapted to polyphase channelize the communications signal via polyphase filterbanks, re-assemble the channels into the original order of the original spread spectrum, and reconstruct the original spread spectrum via polyphase synthesis; a non-linear transform operator receiving one of the channelized signal and the polyphase reconstructed signal and adapted to produce a linear combination of data symbols, DC components, and carrier effects; a low-pass filter connected to the non-linear transform operator for removing high order terms; a second processor connected to the low-pass filter and adapted to separate a plurality of mixed baseband signals; and a third processor adapted to coordinate transform the separated signals from polar coordinates to Cartesian coordinates.

A method is provided for parameterizing an input signal having multiple mixed baseband signals. The method is comprised of the following steps: applying a non-linear transform to the input signal; removing high order terms by a low pass filter which results in a linear combination of data symbols and DC components; resolving the DC components; separating a plurality of mixed baseband signals from the input signal; and transforming input signal coordinates from a polar system to a Cartesian system.

BRIEF DESCRIPTION OF THE DRAWINGS

The present invention will hereinafter be described in conjunction with the following drawing figures, wherein like numerals denote like elements.

FIGS. 2-7 are graphs illustrating discontiguous polyphase waveform construction;

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

Although a spread spectrum radio is described hereinafter with regard to corresponding hardware that accomplishes signal processing functions, the spread spectrum radio may alternatively utilize software, such as found in software defined radios, that encompass applications, routines, or other software modules to accomplish signal processing functions. Those of skill in the relevant art will appreciate that other variations of hardware, software, or any combination thereof may be implemented to accomplish the same functions such as programmable microprocessors or controllers. Additionally, although a radio and a communication system are described hereinafter with regard to spread spectrum communication, such as using CDMA, a variety of communication techniques using different multiplexing or modulation schemes may also be used.

Figure 1:
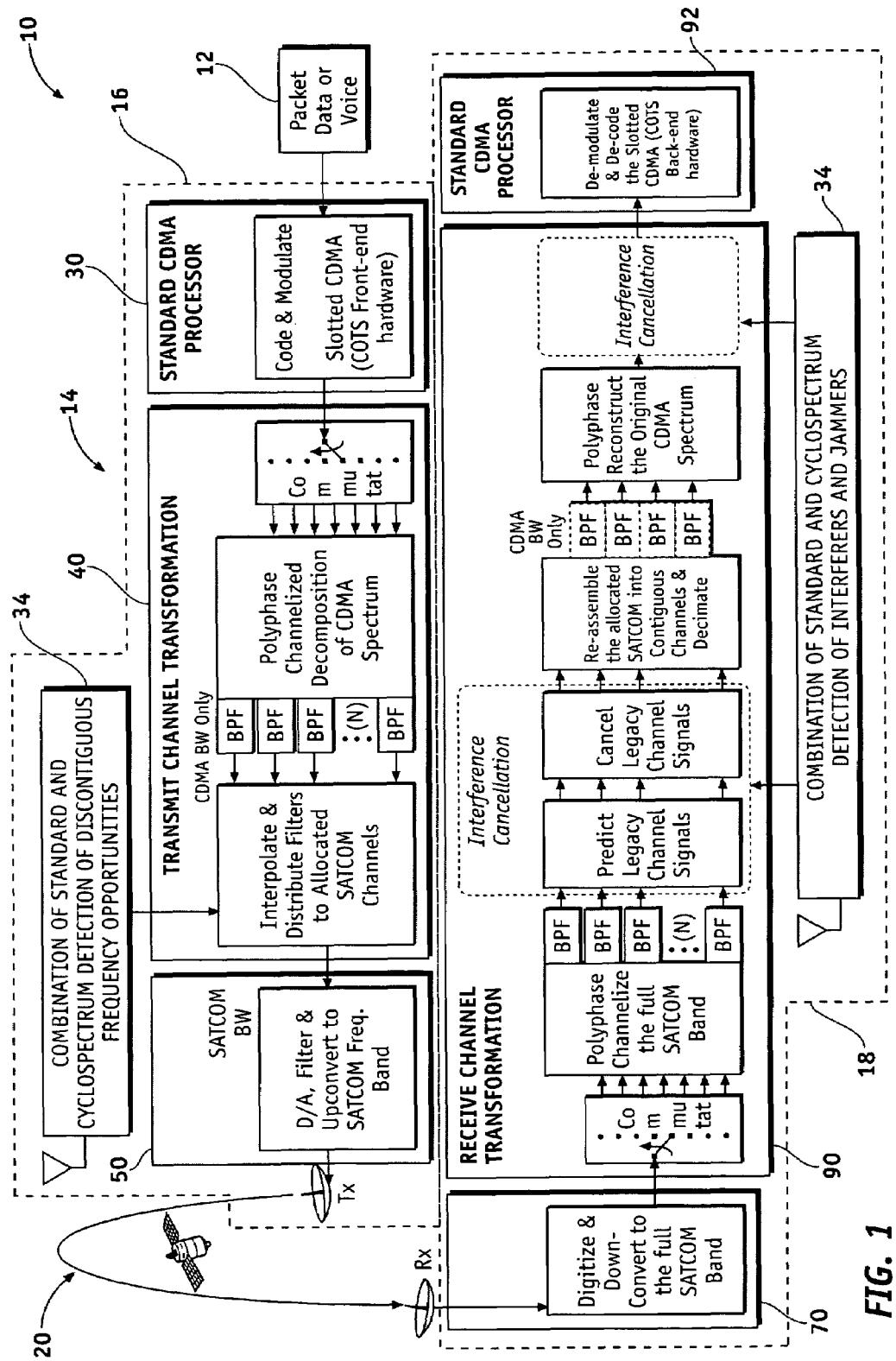
FIG. 1 is a block diagram illustrating a spread spectrum radio.

Referring to the drawings, FIG. 1 is a block diagram illustrating a communications system, shown generally at 10, in accordance with one exemplary embodiment of the present invention. It should be appreciated that the blocks of FIG. 1 (as well as the blocks in the other block diagrams disclosed herein) represent functional elements and are not intended to represent discrete hardware elements. For example, many of the functions illustrated in FIG. 1 can be implemented in a single processor unit. As previously mentioned hereinabove, the functions can be implemented with hardware, software, or a combination of hardware and software.

As shown in FIG. 1, the communications system 10 includes a data source 12, a spread spectrum radio, shown generally at 14, having a transmitter 16 and a receiver 18, and optionally a transponder, shown generally at 20. Although the spread spectrum radio 14 is shown to include both the transmitter 16 and receiver 18, the transmitter 16 and receiver 18 may be separate and individual components in the system 10. The data source 12 delivers a data signal to the transmitter 16 that processes the data and creates a transmit signal. The receiver 18 receives transmitted signals and processes the signal to recover original data contained in the receive signal.

The transmitter 16 includes a modulation/coding unit 30 that prepares a spread signal from data received from the data source 12 and a transmit channel transformation processor 40 that decomposes the spread signal using polyphase channelization. The modulation/coding unit 30 applies modulation and/or coding to the data as is familiar to those of skill in the art. For example, the modulation/coding unit 30 can apply source coding, channel coding, interleaving, and/or various forms of modulation to a data signal. In a spread spectrum system, the modulation/coding unit 30 applies signal spreading to the signal using methods that are well known in the art, such as direct sequence and frequency hopping.

FIGS. 2-7 are graphs illustrating discontiguous polyphase waveform construction. FIG. 2 is a graph showing a continuous spectrum of a DSSS-CDMA spread signal 22. In one exemplary embodiment, the modulation/coding unit 30 is a CDMA processor that codes and modulates packet data or voice signals to provide a continuous spectrum of a DSSS-CDMA spread signal having baseband data coding and DSSS modulation coding. An observed frequency range is analyzed by standard and cyclostationary detection of interferers and other spread spectrum users below a noise floor. The bandwidth and chipping rate of the spread signal are scaled to match an aggregate bandwidth of a total number of channels available within the observed frequency range. Using slotted CDMA, the number of users may be multiplied at a cost of a lower data rate for each user.

FIG. 3 is a graph showing polyphase channelization of the continuous spectrum of the DSSS-CDMA spread signal. The transmit channel transformation processor 40 receives the CDMA spread signal and polyphase channelizes the continuous spectrum of the spread signal into respective channels 24. In one embodiment, a programmable and reversible polyphase channelization process is performed by the transmit channel transformation processor 40. Filter bandwidths of the transmit channel transformation processor 40 are selected such that a group of channelizer filters fit within an available channel width. Any combination of "N" channelizer filters that fit within one of the available channels is selectable. Bandpass filters are used during decomposition of the spread signal by polyphase channelization.

FIG. 4 is a graph showing channels 24 distributed to fit available observed RF spectrum. Once the CDMA spectrum is channelized, each of the channelizer filters are distributed or allocated into any available or usable spectrum and in any order or discontiguously. Determination of available channel width and usable spectrum is based on the detected occupied bands and other polyphase users below a noise floor using a combination of standard and cyclospectrum detection. Samples from each of the channelizer filters are digitally translated to a desired channel position based on the detected occupied bands and other polyphase users below the noise floor. Based upon spectrum observations, the transmit channel transformation processor 40 allocates a power level, or ratio, in each channel and allocates a choice of channels for CDMA operation. To provide a high level of assurance, the receiver 18 (FIG. 1) can feed back a metric of legacy power to CDMA power ratio received in each of the occupied channels corresponding to the received signal. In this embodiment, each of the CDMA channels performs a power ratio measurement on each respective CDMA channel. From the number of CDMA channels authorized and a required dB-down ratio, a maximum level of composite CDMA channel interference to a legacy channel is controlled with active feedback.

After channel distribution, the signal is up-converted for RF transmission and the full desired band is down-converted for signal reception and processing. Both up-conversion and down-conversion are described in greater detail hereinbelow. Referring to FIG. 1, the receiver 18 includes a receive channel transformation processor 90 having a demodulation/decoding unit 92 and an interference processor 34 that conducts interference cancellation, described in greater detail hereinbelow. FIG. 5 is a graph illustrating channelization of a reused band. The fully digitized RF bandwidth provided by the down-converter 70 (FIG. 1) is polyphase channelized by the receive channel transformation processor 90 (FIG. 1) into respective channels 32 (FIG. 5). Digital filtering is similar to channelizing the original CDMA channel spectrum after sample rate interpolation in the transmit channel transformation processor 40. Each of the receive channelization filters is structurally similar to the original CDMA channelization filters previously discussed hereinabove with respect to transmit channel transformation. For example, a programmable polyphase channelization process is performed by the receive channel transformation processor 90. Bandpass filters are used during decomposition of the digitized and down-converted RF bandwidth signal by polyphase channelization. Extraneous spectral inputs from known gaps between channels may be zeroed as a part of a spectrum normalization process for mitigating interference. The original transmitted CDMA spectrum can be reconstructed in a reverse order compared to fabrication as previously discussed with respect to transmit channel transformation.

FIG. 6 is a graph illustrating re-assembly of distributed channels 32 (also FIG. 5) into a single channel, shown generally at 31, with perfect reconstruction. FIG. 7 is a graph illustrating a reconstructed DSSS 33 after equalization and interference cancellation. In one embodiment, after interference cancellation is performed on the channelized signal, the CDMA channelized filters are re-assembled, or translated, to the proper order so as to produce the original continuous transmitted CDMA spectrum. The resulting spectrum and sample rate drops from the total band to the nominal bandwidth of the CDMA signaling spectrum. Polyphase reconstruction of the original baseband CDMA spectrum is then performed to allow for a subsequent standardized CDMA process. Although CDMA process is discussed, the choice of signaling options for subsequent standardized backend processor extends beyond the use of direct sequence CDMA to, for example, "featureless" waveforms. The spectrum for this featureless LPD waveform could be aggregated from a number of disjoint spectral resources that may be underutilized, and presented to a desired waveform processor as a continuous spectrum. The channel transformation process and RF conversion process could manage and assemble the required spectrum with minimal impact to such waveform processor.

In one embodiment, the demodulation/decoding unit 92 performs a standardized DSSS or CDMA baseband process. This process may be a combined time domain multiplexing (TDM) CDMA structure that enables multiple polyphase users to contend for the channel. In this embodiment, a repeating time frame is divided by a number of assignable time slots to multiply the total number users possible at lower data rate. Higher rate users are given multiple slots commensurate with respective data rate needs.

Because some of the techniques used by the interference processor 34 to conduct detection, demodulation, and interference mitigation are common to techniques used to detect frequency opportunities, the interference processor 34 may also conduct detection of frequency opportunities as previously mentioned hereinabove regarding transmit channel transformation. Alternatively, a separate processor may be used to conduct detection of frequency opportunities in the observed RF spectrum using standard and cyclostationary detection. Using the interference mitigation discussed hereinbelow, underlaying of spread spectrum signals into various bands across the spectrum can be achieved by operating directly in-band with legacy communications or by operating in the noise floor adjacent to legacy communications using underused portions of the spectrum.

Figure 8:
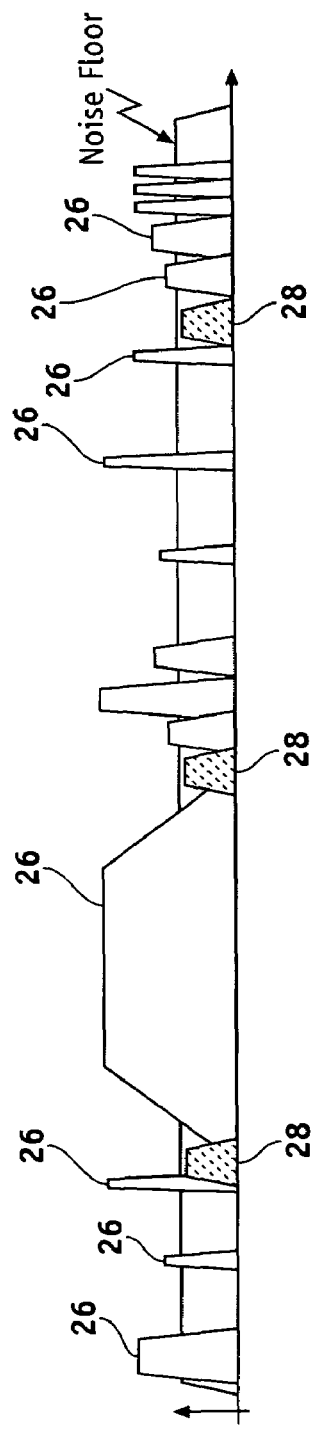
FIG. 8 is a graph illustrating an observed radio frequency (RF) spectrum having occupied bands and other polyphase users.
Figure 9:
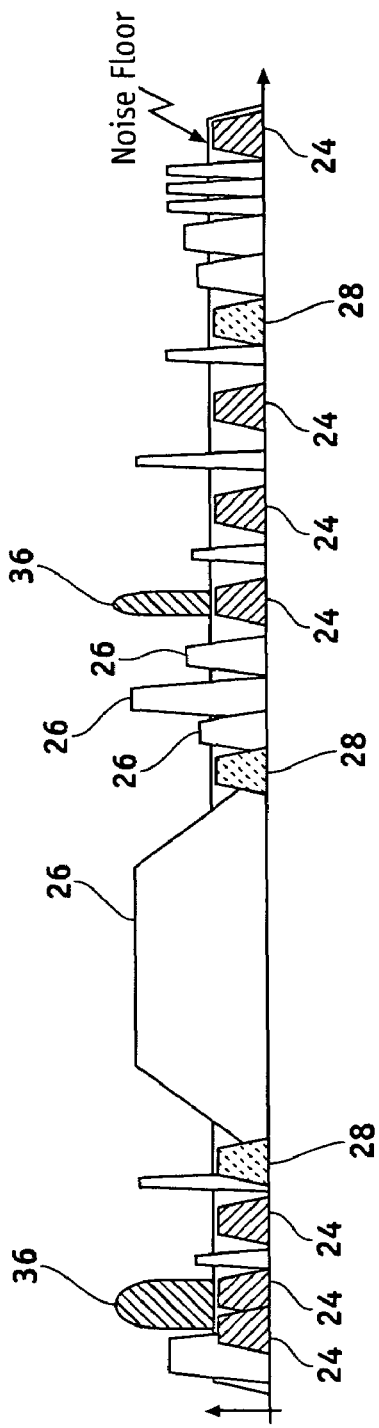
FIG. 9 is a graph illustrating a composite spectrum having the allocated channels among occupied bands, other polyphase users and interferers occupying the observed RF spectrum shown in FIG. 8.

FIG. 8 is a graph illustrating an observed radio frequency (RF) spectrum having occupied bands 26 and other polyphase users 28. FIG. 9 is a graph illustrating a composite spectrum having the allocated channels 24 among occupied bands, other polyphase users and interferers occupying the observed RF spectrum shown in FIG. 8. As best shown from FIGS. 8 and 9, this channel allocation contributes to efficient co-use of the observed occupied spectrum below the noise floor and reduction of co-channel effects.

Referring to FIG. 9, other polyphase users 28 and intermittent co-channel interferers 36 or jammers are detected among the composite spectrum. Detection, demodulation, and interference mitigation of legacy signal interference or other intermittent sub-band interferers may be conducted prior to re-assembling the CDMA channelization filters or after polyphase reconstruction of the original CDMA spectrum. During interference cancellation, the receive channel transformation processor 90 predicts and cancels legacy channel signals. Interference channel signal strength is measured to provide signal power ratio feedback data to the CDMA transmitter 16. Depending on the type of interference cancellation techniques used, the specific set of functions is variable. Doppler tracking and channel equalization are optionally performed by the interference processor 34 depending on the selected type of interference cancellation. The interference processor 34 removes a high level of interference from simultaneous legacy signaling to improve CDMA signaling signal-to-noise ratio (SNR) margin and to allow a maximum number of simultaneous CDMA users.

A variety of interference mitigation methods may be performed by the interference processor 34 including but not limited to: interference prediction with inverse filtering of the interference; spectral self-normalization to suppress interfering spectral peaks; and adaptive weighting and decision directed feedback cancellation. In decision directed feedback cancellation, legacy signals within each channel are demodulated to identify and separate each signal, then re-modulated and inverse equalized out of phase with a stored receive signal to cancel them from the CDMA channel process. Cyclostationary feature detection is conducted by the interference processor 34 to extract interferer features prior to cancellation.

Co-channel interference separation employs temporal, spectral, local, and spatial diversity of proximity observers to analyze the incident signal space. A combination of blind and "less blind" techniques can be used to reduce algorithmic latency and address fading. In one embodiment, the interference processor includes a non-linear transform that produces a less ambiguous probability density function (PDF) space that is generally free from the effects of carrier uncertainties and rotation effects. This PDF space enables a separation of multi-signal data "bauds" at baseband without explicit knowledge of signal type or frequency offset.

Figure 10:
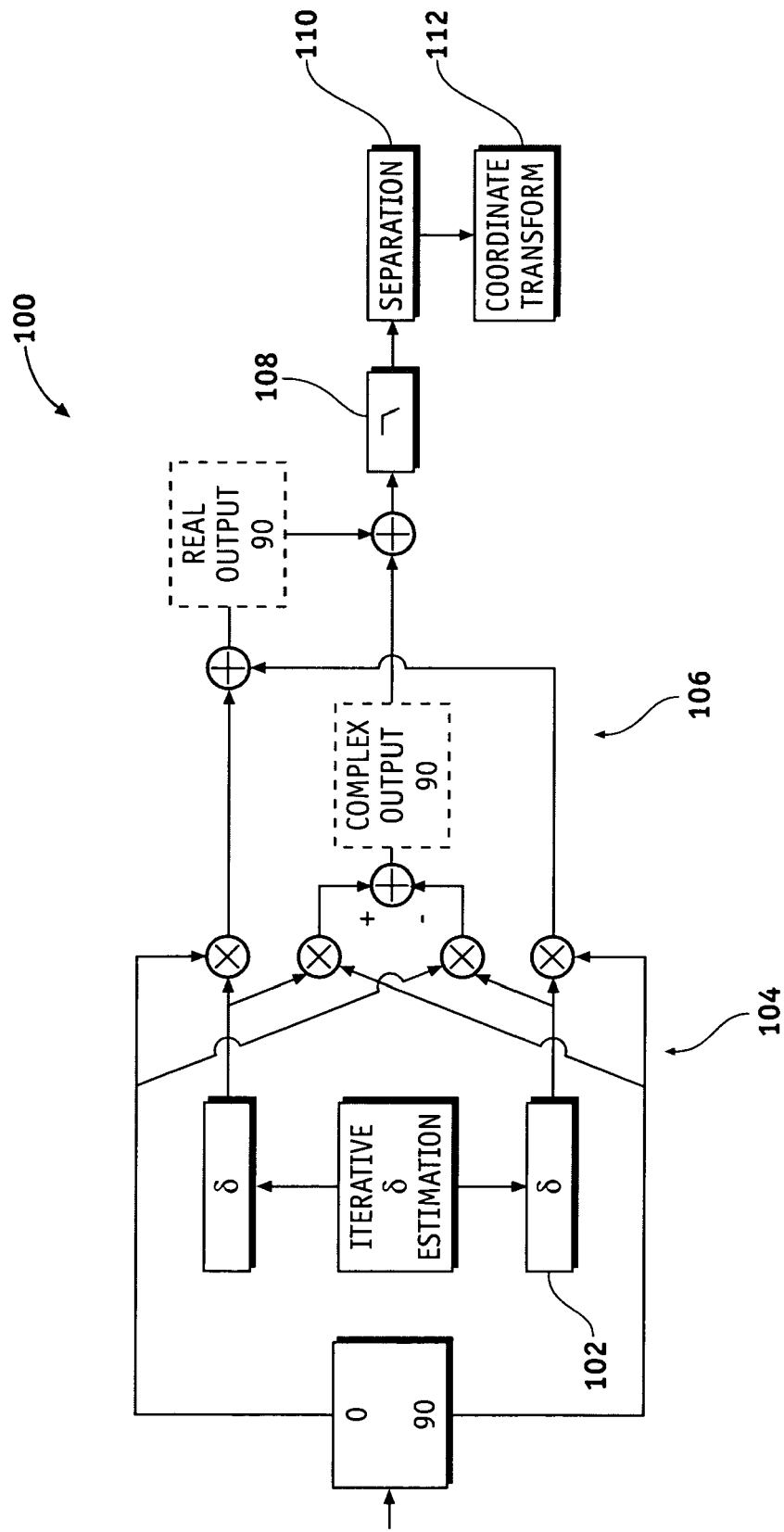
FIG. 10 is a block diagram illustrating one embodiment of a non-linear transform.

FIG. 10 is a block diagram illustrating one embodiment of a non-linear transform processor, shown generally at 100. The input to the non-linear transform 100 is a composite signal consisting of unknown carrier frequencies, symbol rates, modulation types, and other signal parameters. In one embodiment, the non-linear transform 100 includes an iterative delay ($\delta$) estimator 102, a balanced multiplier, shown generally at 104, and phase shifters, shown generally at 106, that can be adjusted so as to produce real or complex output depending on a desired application. The output of the non-linear transform is passed through a low pass filter 108 and includes a linear representation of data symbols and a DC component found in the received unknown signal. The signal is then passed through a separation unit 110 and a coordinate transform processor 112. The non-linear transform 100 eliminates carrier effects while producing distinct, recognizable features in a plane defined by phase modes (horizontal direction) and amplitude modes (depth direction). The data symbols and DC component have a PDF showing distinct amplitude and phase modes, independent of carrier, and projections which can be used for parameterization of the signal.

In multi-signal situations, the non-linear transform 100 is used to separate signals in a straight-forward manner. The non-linear transform 100 removes carrier effects and produces distinct PDFs that can be used to parameterize signals while enabling an efficient time-domain separation of multiple in-band signals, for example, without fast Fourier transforms (FFTs). Furthermore, the resulting PDFs provide a possible means of blind spatial separation to address fading.

In the multi-signal case, and without loss of generality, the input signal can be represented as:

$$s_1(t)=A_1(t)e^{j(\omega_1 t+\Psi_1(t))} \text{ and } s_2(t)=A_2(t)e^{j(\omega_2 t+\Psi_2(t))}$$

As the non-linear transform is applied to the input signal, the resultant is:

$$T(s_1(t)+s_2(t))=$$

$$A_1(t)A_1(t-\tau)e^{j[\Psi_1(t-\tau)-\Psi_1(t)]}e^{-j\omega_1\tau}+A_1(t)A_2(t-\tau)e^{j[\Psi_2(t-\tau)-\Psi_1(t)]}e^{-j\omega_1 t+j\omega_2 t-j\omega_2\tau}+$$

$$A_2(t)A_1(t-\tau)e^{j[\Psi_1(t-\tau)-\Psi_2(t)]}e^{j\omega_1 t-j\omega_2 t-j\omega_1\tau}+A_2(t)A_2(t-\tau)e^{j[\Psi_2(t-\tau)-\Psi_2(t)]}e^{-j\Psi_2\tau}$$

(Eq. 1). The cross terms are removed by filtering to leave a linear combination of data symbols that are free of carrier effects.

A number of different approaches may be used for separation of signals using a two-dimensional search, including least squares estimation:

$$x(t)=As(t)+u(t)$$

$$s(t)=[s_1(t),s_2(t)]^T$$

$$Q(\omega)=\|x(t)-As(t)\|^2$$

$$s'(t)=(A^H A)^{-1}A^H x(t)$$

$$Q(\omega)=\|x(t)-A(A^H A)^{-1}A^H x(t)\|^2$$

where x(t) represents the output of the low pass filter in vector notation, u(t) represents the low pass version of noise related terms, $Q(\omega)$ represents the cost function of the least squares approach, and s'(t) minimizes $Q(\omega)$. The least squares approach generally requires a two-dimensional search.

In another approach, a matrix W is a projection matrix on the null space of A that leads to a single-dimensional search for the solution where:

$$P(\omega)=b^H(\omega)Wb(\omega)$$

and finding the minima of this equation provides an estimate of frequencies.

In another embodiment, appropriate for power and processing limitations of manpack, handheld, or remote sensor equipment, the delay parameter is constrained to enable solution of the polynomial given by:

$$P(z)=b^T(1/z)Wb(z)$$

where the polynomial in "z" has zeros corresponding to the DC components produced by the non-linearity. The separation unit 110 performs the desired solution for DC components and initial signal separation. The coordinate transform processor 112 prepares the signals for further feature extraction such as cyclostationary feature extraction. For example, the DC component may represents a carrier of the signal (or signals) being analyzed. This approach may be used for instantaneous frequency measurement (IFM). In one embodiment, the phase may contain data from one or more signals that can be separated. The DC component can be left in prior to the coordinate transform, or, for a "normalized" transform plane, the carrier can be removed first depending on whether information regarding the carrier or the actual data is desired. For example, in the case of frequency shift key, or frequency hopping, the DC component represents a current hop frequency which can be extracted over time to get a hop set (or transec).

The signal space is mapped to an alternate plane that produces distinct, recognizable features, regardless of carrier or frequency modulation, a "less blind" spatial separation of the remaining signals may be performed in a more efficient manner that is able to mitigate environmental non-stationarity. Baud features may be determined without explicit knowledge of signal type or center frequency to enable precise baud synchronization regardless of signal location in band. Additional benefits of this spectral-spatial separation include improving the time-difference-of-arrival (TDOA) which is used in a distributed geolocation approach. For example, removing interference effects from TDOA measurements can improve circular error probability (CEP) and enable precise beam-forming and real time targeting.

Figure 11:
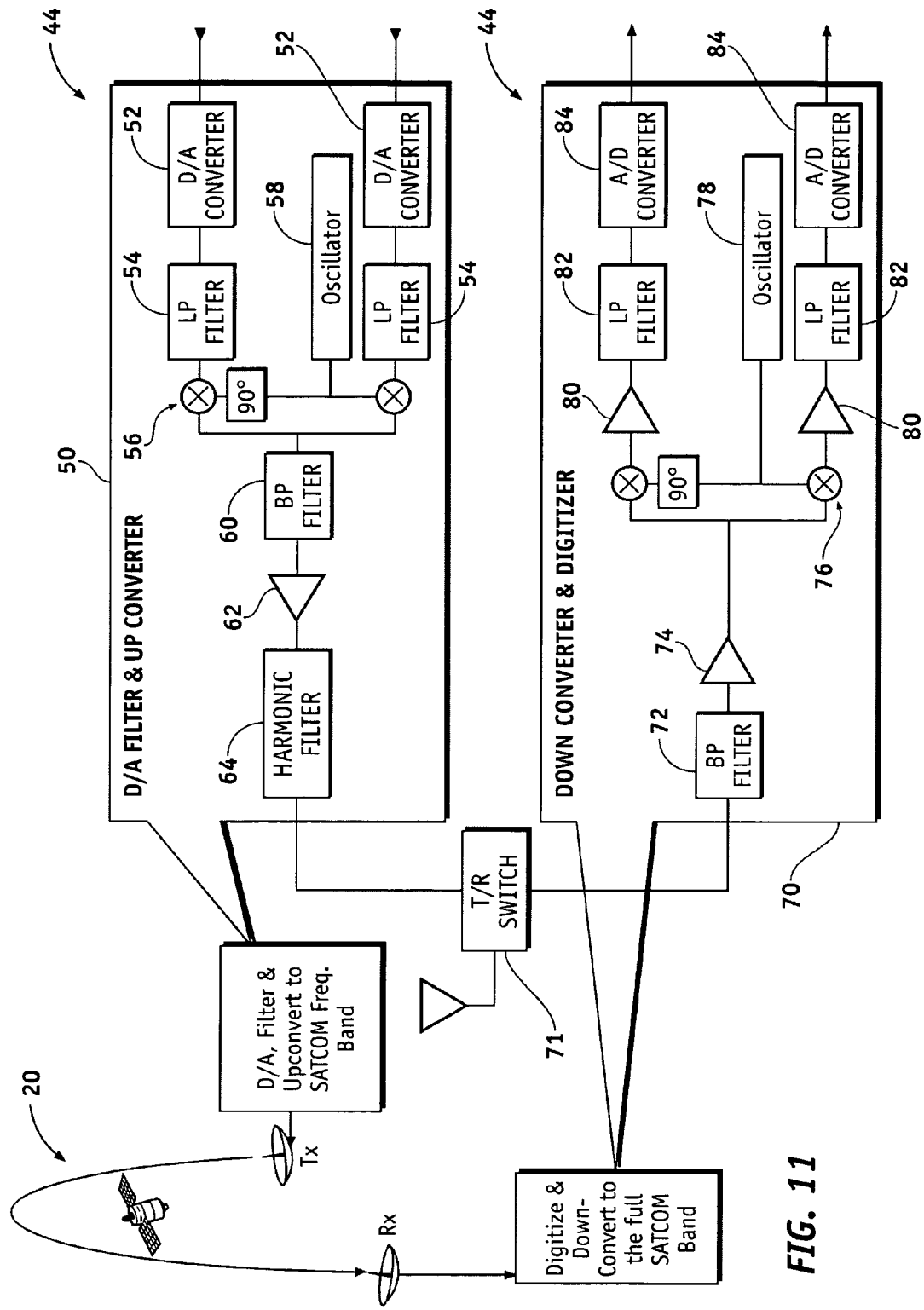
FIG. 11 is a block diagram illustrating an up-and-down converter with optional transponder component.

FIG. 11 is a block diagram of an up-and-down converter with optional transponder component. In this embodiment, the spread spectrum radio 14 (FIG. 1) includes a combination up-and-down converter, shown generally at 44, with a transmit/receive (TIR) switch 71 and optional transponder 20. Although the RF architecture shows a combination up-and-down converter 44, a separate up-converter may be used to operate independently and stand-alone from a separate down-converter. For example, the transmitter 16 (FIG. 1) may include an up-converter processor, and the receiver 18 (FIG. 1) may include a down-converter processor. Additionally, other variations and different embodiments of RF architecture may also be selected for up-and-down conversion.

An up-converter processor 50, or up-converter, conditions the distributed signal from the transmit channel transformation processor 40 for RF transmission. The up-converter 50 includes digital-to-analog (D/A) converters 52, or DACs, that convert the digital transmit data to the RF transmit signal. A down-converter processor 70, or down-converter, converts RF received signals to digital information for subsequent processing by a receive channel transformation processor 32 described in greater detail hereinbelow. Although two separate processors are described with regard to up-conversion and down-conversion, a common processor may be used to accomplish up-and-down conversion.

The up-converter 50 receives the digital data after channel allocation and first converts the digital data to an analog baseband signal. This analog signal contains each of the channels spaced over the available spectrum. A pair of DACs may be used to generate in-phase and quadrature-phase (I&Q) signals that are up-converted to desired transmit channel frequencies. The output of each DAC 52 is fed through a low pass filter 54 to remove all D/A harmonics outside of the transmit band. The signal is then passed through amplification, not shown, to a desired value for up-converting mixing. The peak value of the composite signal is generally several dB higher than the average value. In this example, an actual peak-to-average ratio of about a 6 dB is expected. To tolerate this peak-to-average ratio, the average level into mixing should be about 6 dB below an allowable level for a non-peaking signal. In this example, a gain compression of about 0.2 dB generally will not adversely impact a non-peaking signal.

A doubly-balanced mixer, shown generally at 56, such as a Mini-circuits JMS-1 MH, may be used as a frequency conversion element. This mixer generally requires a local oscillator (LO) power of +13 dBm. A 1 dB gain compression point is approximately +8 dBm, and a 0.2 dB gain compression point is approximately +5 dBm. To tolerate the 6 dB peak-to-average ratio in this example, the average input power to the mixer 56 is about −1 dBm. The conversion loss of this mixer is typically less than 6 dB, and the average output signal is approximately −7 dBm. The JMS-1MH mixer typically provides 60 dB of isolation between an LO port and an RF port. At an LO power of +13 dBm, the LO leakage from the RF port is approximately −47 dBm at 301 MHz. At −47 dBm, the level of the radiated energy at LO frequency is 40 dB below the total signal power and approximately 25 dB below the power in any one of the transmitted channels.

An LO reference signal for the mixer 56 is provided by a reference oscillator 58 such as, for example, a 301 MHz Oscillator. In this example, a maximum allowable frequency variation is approximately 150 Hz. For stability in this example, the reference oscillator 58 should have stability better than about 0.5 ppm. For example, a Temex QED 110 may be used having frequencies from about 0.4 MHz to about 110 MHz and providing a stability of about 0.2 ppm over a temperature range of −30 C to +75 C. To realize the 301 MHz frequency, the oscillator 58 provides a 100.3 MHz signal to a 3× frequency multiplier.

The output of the mixer 56 is fed to a band pass filter 60 to remove all undesired signal and then fed into a power amplifier 62. A final RF analog filter 64 provides clean-up attenuation of D/A harmonics outside of the nominal transmit band. Additionally, while a minimum size antenna is desirable, reducing the size of the antenna generally reduces the antenna gain. Power amplifier methods of the spread spectrum radio 14 can handle high peak-to-average ratios without having to generate a full average power 100% of the time. Adaptive bias amplifiers are amplifiers where a bias level can be adjusted externally to change a corresponding power rating. Adaptive bias amplifiers can also be used for the power amplifier 62 based on a determination by the up-converter 50 of when a high peak value condition exists and corresponding command to the amplifier to a new bias state.

At the down-converter 70, the full SATCOM band, such as from the transponder 20, is first fed into a bandpass filter 72 to remove as much extraneous signal as practical and to reduce potential inter-modulation products that could cause interference within the spread spectrum radio 14. This signal is then passed through a low noise amplifier (LNA) 74. Removing extraneous signal generally minimizes a required dynamic range of the LNA 74. In one example, if the antenna gain is 0 dBi, then a noise temperature of the down-converter 70 should be less than 500 K, which is equivalent to a 4.3 dB noise figure given no excess ambient noise. Although up-and-down conversion is discussed herein with regard to satellite communication bands, the spread spectrum radio 14 is not intended to be limited to such application and may be used with any of a variety of communication bands with corresponding modifications to filters, oscillators, and other frequency-based components and circuitry. The output of the LNA 74 is fed into a pair of quadrature mixers, shown generally at 76, where the signal is converted to I&Q baseband signals.

The outputs of the mixers 76 are AC coupled to amplifiers 80 and fed through low pass filters 82 to remove undesired signals which also generally removes problems associated with DC imbalance of the mixers 86. The outputs of the filters 82 are then fed into analog-to-digital converters (ADCs) 84. 12-bit ADC's may be used in one embodiment, and the sampling rate of the ADCs is generally greater than twice the signal bandwidth. Many ADC types are suitable including, by way of example and not of limitation, model type Analog Devices part number AD9244-65. This device is a 14-bit ADC with a sample rate of 65 Msps and having a power dissipation typically about 600 mW.

Particular antenna implementation can be determined after an antenna gain is established. The T/R switch 71 may be included to time-share the antenna between the up-converter 50 and the down-converter 70. For example, a half-duplex system allows a switch to be used for this function. In a half-duplex system, the up-converter amplifier 62 can be switched off to simplify noise problems. In a full-duplex system, it may be necessary to add a band reject filter to the output of the transmit amplifier 62 to remove noise at the receive frequency.

Although direct I&Q up-conversion examples of RF architectures have been discussed hereinabove for conversion of digital data to an analog transmit signal, a low intermediate frequency (IF) with mixer up-conversion based architecture is also suitable in addition to other RF architectures. For example, an analog signal with 19 MHz bandwidth can be generated at a higher frequency, such as 70 MHz. To generate this signal, the DAC samples at a rate greater than twice the highest frequency, for example at a rate greater than approximately 160 Msps. DAC converters are available that can operate at this sample rate such as Analog Devices part number AD9775. The AD9775 is a 14-bit device that operates at 400 Msps and dissipates about 1.5 Watts. In this example, the output of the DAC should be filtered to remove replications of the signal that may occur at baseband or at other frequencies. If the analog signal is generated at a sufficiently high IF frequency, it is not necessary to use I&Q up-conversion techniques. Filtering can be used to reduce all undesired mixing products below a desired spur free dynamic range. A 12-bit converter can provide a 74 dB dynamic range with a corresponding change in the local oscillator frequency to accommodate a non-baseband input.

The receive signal may also be digitized at an IF frequency such as 70 MHz. In a manner similar to up-conversion, the ADC samples at a rate greater than twice the highest frequency, for example at a rate greater than approximately 160 Msps. ADC converters are available that operate at this sample rate such as Analog Devices part number AD9430-210. The AD9430-210 is a 12-bit device that operates at 200 Msps and dissipates about 1.3 Watts. In this example, anti-aliasing filters are used to provide 74 dB rejection at half the center IF frequency 35 MHz. Additionally in this example, a 70 MHz filter with a pass bandwidth of 20 MHz should have approximately 6 poles to provide this rejection at 35 MHz.

Figure 12:
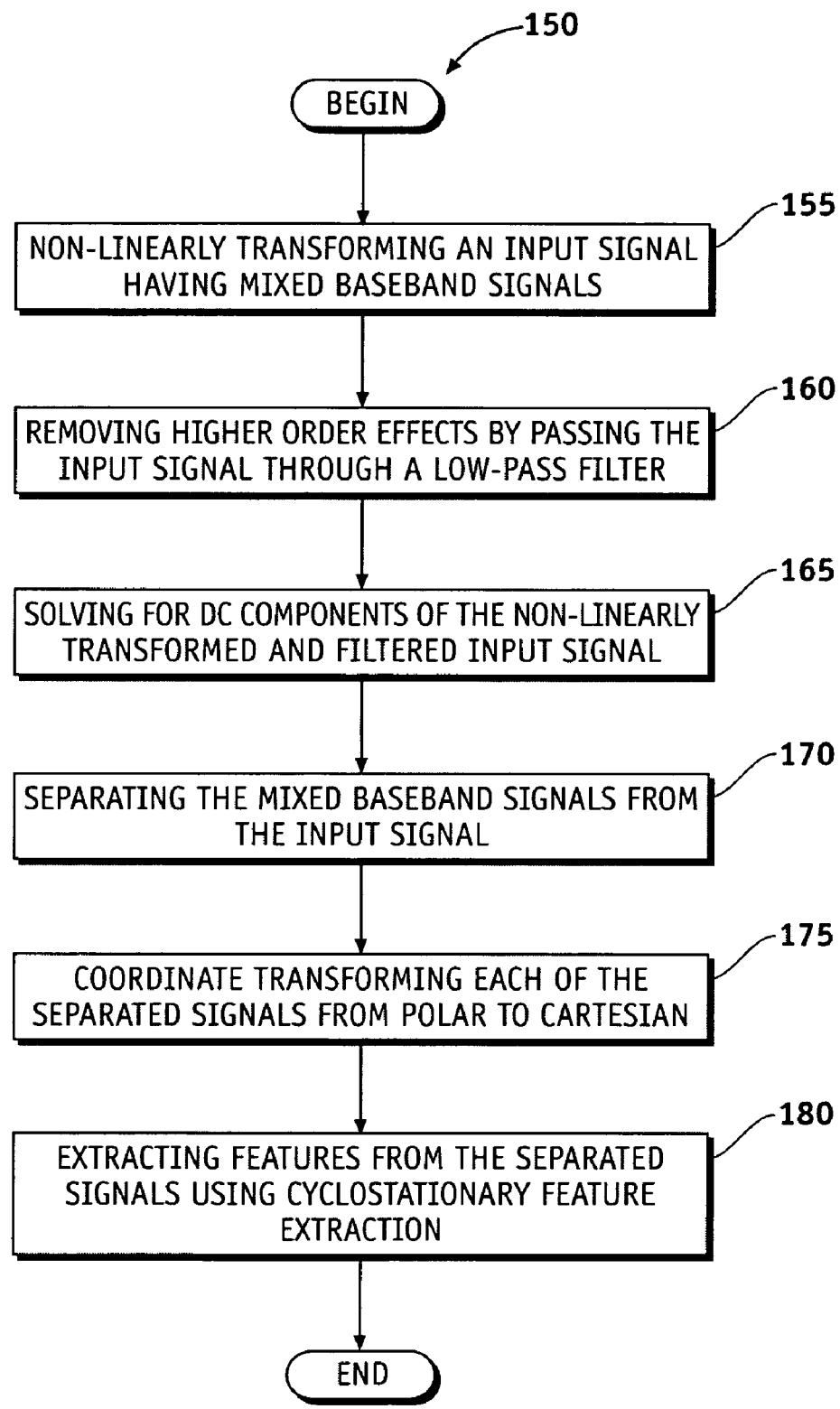
FIG. 12 is a flowchart showing a method of parameterizing an input signal having mixed baseband signals.

FIG. 12 is a flowchart showing a method of parameterizing an input signal having mixed baseband signals. The signal parameterization method of the present invention is suited to assist in the spectrum awareness operation previously discussed hereinabove with regard to transmit channel transformation. For example, determination of available channels and usable spectrum in an observed RF spectrum may be accomplished using the signal parameterization method. Additionally, the signal parameterization method is suited to assist in the detection of interferers or jammers among the composite spectrum during signal reception. For example, without presumptions or knowledge of carrier frequencies, modulation domains, data rates, and bandwidths, classification and separation of signals is made possible using the signal parameterization method in combination with cyclostationary feature detection.

In one embodiment, prior to signal parameterization, the full SATCOM spectrum is digitized and down-converted by the down-converter 70. Analog RF low noise amplification, pre-selection, down-conversion, and A/D sampling functions are performed by the down-converter 70 (FIGS. 1 and 11). The fully digitized RF bandwidth provided by the RF down-converter is polyphase channelized. The receive channelizer uses digital filtering similar to channelizing the original CDMA channel spectrum after sample rate interpolation. Extraneous spectral inputs from known gaps between channels may be zeroed as a part of a spectrum normalization process for mitigating interference. The original CDMA spectrum can be reconstructed in a reverse order compared to fabrication.

Detection, demodulation, and interference mitigation of legacy signal interference or other intermittent sub-band interferers are conducted by the interference processor 34 (FIG. 1). The interference channel signal strength is measured to provide a signal power ratio feedback data to the CDMA transmitter. Doppler tracking and channel equalization are optionally performed depending on the type of interference cancellation techniques used.

As previously mentioned, a variety of interference mitigation methods are usable by the interference processor 34 (FIG. 1) including but not limited to: interference prediction with inverse filtering of the interference; spectral self-normalization to suppress interfering spectral peaks; adaptive weighting; and, decision directed feedback cancellation. In decision directed feedback cancellation, legacy signals within each channel are demodulated to identify and separate each signal, then re-modulated and inverse equalized out of phase with a stored receive signal to cancel them from the CDMA channel process. Cyclostationary feature detection is employed to extract interferer features prior to cancellation.

The method begins at step 150. An input signal having multiple mixed baseband signals is passed through a non-linear transform 100 (FIG. 10) at step 155. This input signal is a composite signal of unknown carrier frequencies, symbol rates, modulation types, and other signal parameters. In one embodiment, the input signal is passed through a conjugate delayed product multiplier 104 (FIG. 10) having an iterative delay estimator 102 (FIG. 10). Higher order terms are then removed by passing the signal through a low-pass filter 108 (FIG. 10) at step 160. The resulting signal is a linear representation of data symbols and DC components, and a PDF of this representation shows distinct amplitude and phase modes, independent of carrier. The projections of this PDF can be used for parameterization of the signal.

The DC components of the non-linearly transformed and filtered input signal are solved by the separation unit 110 (FIG. 10) at step 165 to provide carrier information about each of the mixed baseband signals. The mixed baseband signals are subsequently separated from the input signal at step 170 by the separation unit 110 (FIG. 10). After this initial signal separation, the signals are converted from polar coordinates to Cartesian coordinates at step 175 by the coordinate transform unit 112 (FIG. 10). Further analysis may be performed by extracting features from the separated signals using cyclostationary feature extraction at step 180.

By applying non-linear signal processing at the input to the receiver, interference created by other users is mitigated. CDMA channelized filters that were distributed over the various set of channels are re-assembled, or translated, to the same order of the CDMA signal after the polyphase channelization of the original continuous transmitter CDMA spectrum. The original baseband CDMA spectrum is polyphase reconstructed to allow for standardized CDMA processing.

Using DSSS assists in transmitting at power levels below surrounding legacy signal and interference with processing gain sufficient to provide a robust channel. The interference mitigation provided by cyclospectral detection and subsequent cancellation as previously discussed hereinabove improves potential data rate per user and generally increases allowable number of users such as in multiple, simultaneous CDMA channel communication.

The polyphase channel transformation processes previously discussed hereinabove generally make the RF and allocated channel process transparent to the backend CDMA communication process. The CDMA process behind the polyphase transformation operates as if a conventional RF front end, such as a cellular telephone, were used although other embodiments are also available. In one embodiment, a normal contiguous RF interface is provided to the CDMA (or CDMA-like) process regardless of frequency allocation or dynamic changes to the channels allocations. In this embodiment, the present invention can be bootstrapped to a standard CDMA and networking process with associated COTS hardware at low cost, small size, low weight, and low power consumption at the backend. Additionally, digital polyphase channelization filtering has a capability for perfect waveform reconstruction, and the polyphase channel transformations take advantage of such processing efficiency.

The invented method and apparatus present significant benefits that would be apparent to one of ordinary skill in the art. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of parameterizing an input signal having a plurality of mixed baseband signals, the method comprising the steps of:

applying a non-linear transform to an input signal, in order to eliminate carrier effects from the input signal and to produce a non-linearly transformed signal having distinct, recognizable features in a plane defined by phase modes and amplitude modes;

passing the non-linearly transformed signal through a low pass filter to produce a linear combination of data symbols and DC components;

determining the DC components, wherein the DC components have probability density functions with distinct amplitude and phase modes;

separating, using the probability density functions, a plurality of mixed baseband signals from the input signal to produce separated signals; and coordinate transforming each of the separated signals from polar coordinates to Cartesian coordinates to produce coordinate transformed signals.

2. A method of parameterizing an input signal according to claim 1, wherein said non-linearly transforming comprises:

passing an input signal through a conjugate delayed product multiplier having an iterative delay estimator; and generating at least one of a complex output of the input signal and a real output of the input signal.

3. A method of parameterizing an input signal having a plurality of mixed baseband signals, the method comprising the steps of:

applying a non-linear transform to an input signal;

passing the input signal through a low pass filter to produce a linear combination of data symbols and DC components;

determining the DC components, wherein said DC component determining step is selected from performing a least squares operation, performing a null space projection, and performing a polynomial solution;

separating a plurality of mixed baseband signals from the input signal to produce separated signals; and coordinate transforming each of the separated signals from polar coordinates to Cartesian coordinates to produce coordinate transformed signals.

4. A method of parameterizing according to claim 3 further comprising extracting features from the separated signals using cyclostationary feature extraction.

5. A method of parameterizing according to claim 4, wherein said cyclostationary feature extraction is selected from performing a non-linear operation and performing a joint time-frequency autocorrelation.

6. A method of parameterizing an input signal having a plurality of mixed baseband signals, the method comprising the steps of:

applying a non-linear transform to an input signal;

passing the input signal through a low pass filter to produce a linear combination of data symbols and DC components;

determining the DC components;

separating a plurality of mixed baseband signals from the input signal to produce separated signals;

coordinate transforming each of the separated signals from polar coordinates to Cartesian coordinates to produce coordinate transformed signals; and conducting cyclostationary feature detection on the coordinate transformed signals.

7. A method of recovering at least one baseband source signal from a plurality of mixed signals, the method comprising the steps of:

down-converting and digitizing a plurality of mixed signals in an RF bandwidth;

polyphase channelizing the digitized bandwidth;
re-assembling the channels into an original order of an original spectrum and polyphase reconstructing the original spectrum;
passing an input signal selected from the polyphase channelized signal and the polyphase reconstructed signal through a nonlinear transform and a low-pass filter to produce non-linear transformed signals, wherein the non-linear transform eliminates carrier effects from the input signal to produce a non-linearly transformed signal having distinct, recognizable features in a plane defined by phase modes and amplitude modes;
determining DC components of each of the non-linear transformed signals, wherein the DC components have probability density functions with distinct amplitude and phase modes;
separating, using the probability density functions, a plurality of mixed baseband signals to produce separated signals; and
coordinate transforming each of the separated signals from polar coordinates to Cartesian coordinates to produce coordinate transformed signals.

8. A method of recovering at least one baseband source signal from a plurality of mixed signals, the method comprising the steps of:
down-converting and digitizing a plurality of mixed signals in an RF bandwidth;
polyphase channelizing the digitized bandwidth;
re-assembling the channels into an original order of an original spectrum and polyphase reconstructing the original spectrum;
passing one of the polyphase channelized signal and the polyphase reconstructed signal through a non-linear transform and a low-pass filter;
determining DC components of each of the non-linear transformed signals;
separating a plurality of mixed baseband signals by performing:

$x(t)=As(t)+u(t)$ $s(t)=[s_1(t),s_2(t)]^T$ $Q(\omega)=\|x(t)-As(t)\|^2$ $s'(t)=(A^H A)^{-1} A^H x(t)$ $Q(\omega)=\|x(t)-A(A^H A)^{-1} A^H x(t)\|^2$ where x(t) represents the output of the low pass filter in vector notation, u(t) represents the low pass version of noise related terms, $Q(\omega)$ represents the cost function of a least squares approach, and s'(t) minimizes $Q(\omega)$; and
coordinate transforming each of the separated signals from polar coordinates to Cartesian coordinates.

9. A method according to claim 7, wherein said passing step comprises the steps of:
passing the input signal through a conjugate delayed product multiplier having an iterative delay estimator; and
generating at least one of a complex output of the input signal and a real output of the input signal;
wherein the input signal is selected from the polyphase channelized signal and the polyphase reconstructed signal.

10. A method of recovering at least one baseband source signal from a plurality of mixed signals, the method comprising the steps of:
down-converting and digitizing a plurality of mixed signals in an RF bandwidth;
polyphase channelizing the digitized bandwidth;
re-assembling the channels into an original order of an original spectrum and polyphase reconstructing the original spectrum;
passing one of the polyphase channelized signal and the polyphase reconstructed signal through a non-linear transform and a low-pass filter;
determining DC components of each of the non-linear transformed signals, wherein said DC component determining step is selected from performing a least squares operator, performing a null space projection, and performing a polynomial solution;
separating a plurality of mixed baseband signals to produce separated signals; and
coordinate transforming each of the separated signals from polar coordinates to Cartesian coordinates to produce coordinate transformed signals.

11. A method according to claim 6 further comprising extracting features from the separated signals using cyclostationary feature extraction.

12. A method according to claim 11, wherein said cyclostationary feature extraction is selected from performing a non-linear transform operation and performing a joint time-frequency autocorrelation.

13. A method of recovering at least one baseband source signal from a plurality of mixed signals, the method comprising the steps of:
down-converting and digitizing a plurality of mixed signals in an RF bandwidth;
polyphase channelizing the digitized bandwidth;
re-assembling the channels into an original order of an original spectrum and polyphase reconstructing the original spectrum;
passing one of the polyphase channelized signal and the polyphase reconstructed signal through a non-linear transform and a low-pass filter;
determining DC components of each of the non-linear transformed signals;
separating a plurality of mixed baseband signals to produce separated signals; and
coordinate transforming each of the separated signals from polar coordinates to Cartesian coordinates to produce coordinate transformed signals; and
conducting cyclostationary feature detection on the coordinate transformed signals.

14. A digital radio receiver comprising:
a channel transformer adapted to polyphase channelize a communications signal, re-assemble the channels into contiguous channels, and polyphase reconstruct the original transmission spectrum;
a non-linear transform operator adapted to receive one of the polyphase channelized signal and the polyphase reconstructed signal from said channel transformer and adapted to produce a linear combination of data symbols, and DC components;
a low-pass filter connected to said non-linear transform operator for producing a linear combination of data symbols and DC components;
a first signal separator connected to said low-pass filter and adapted to separate a plurality of mixed baseband signals;

a coordinate transform operator connected to said first signal separator and adapted to transform the separated signals from polar coordinates to Cartesian coordinates to produce coordinate transformed signals; and a second signal separator connected to said coordinate transform operator and adapted for signal separation of the coordinate transformed signals.

15. A spread spectrum receiver comprising:

a channel transformer adapted to polyphase channelize a communications signal, re-assemble the channels into contiguous channels, and polyphase reconstruct the original transmission spectrum;

a non-linear transform operator adapted to receive one of the polyphase channelized signal and the polyphase reconstructed signal from said channel transformer and adapted to produce a linear combination of data symbols, and DC components;

a low-pass filter connected to said non-linear transform operator for producing a linear combination of data symbols and DC components;

a first signal separator connected to said low-pass filter and adapted to separate a plurality of mixed baseband signals;

a coordinate transform operator connected to said first signal separator and adapted to transform the separated signals from polar coordinates to Cartesian coordinates; and a second signal separator connected to said coordinate transform operator and adapted for signal separation of the separated signals from said coordinate transform operator.

16. A spread spectrum receiver according to claim 15, wherein said second signal separator is adapted for cyclostationary feature detection selected from non-linear transform operation and joint time-frequency autocorrelation.

17. A spread spectrum receiver according to claim 15 further comprising a CDMA processor connected to said second signal separator for demodulating and decoding the separated signals.

18. A receiver according to claim 14 further comprising:

a down-converter connected to said channel transformer for digitizing and down-converting a full RF band.

19. A receiver according to claim 14, wherein said non-linear transform operator comprises a conjugate delay product multiplier having an iterative delay estimator.

20. A receiver according to claim 14, wherein said first signal processor is adapted to perform one of a least squares operation, a null space projection, and a polynomial solution.

* * * * *